United States Patent Office.

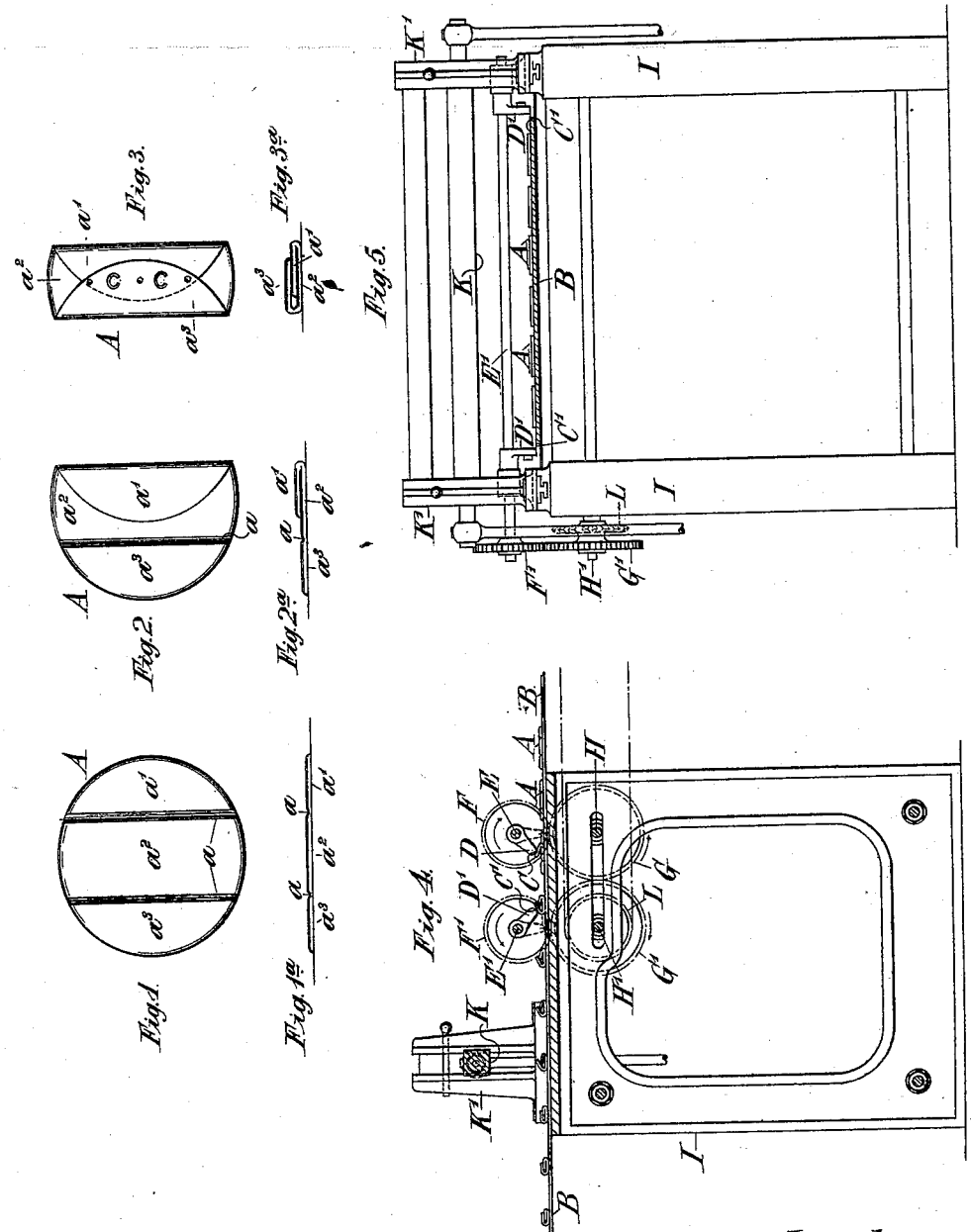

WILLIAM THEODORE CARR, OF CARLISLE, ENGLAND.

METHOD OF MANUFACTURING BISCUITS.

SPECIFICATION forming part of Letters Patent No. 628,449, dated July 11, 1899.

Application filed May 23, 1898. Serial No. 681,491. (No model.)

*To all whom it may concern:*

Be it known that I, WILLIAM THEODORE CARR, a subject of the Queen of Great Britain and Ireland, residing at Carlisle, in the county of Cumberland, England, have invented new and useful Improvements in Methods of Manufacturing Biscuits, (in respect whereof I have applied for a patent in Great Britain to bear date of March 9, 1898, No. 5,805,) of which the following is a specification.

This invention relates to the manufacture of biscuits in a manner which imparts to the product a character at once novel and distinctive.

In the accompanying drawings, Figures 1 to $3^a$ illustrate the manufacture of biscuits according to my improved method. Fig. 1 represents in plan a disk or blank of dough, Fig. $1^a$ being a side view thereof. Fig. 2 is a plan of the said blank, having one of its ends or flaps folded over, Fig. $2^a$ being a corresponding side view. Fig. 3 is a plan of the finished product, Fig. $3^a$ being a corresponding side view. Fig. 4 is a longitudinal section of a form of apparatus adapted for carrying out the improved method of manufacture. Fig. 5 is an elevation looking toward the delivery end of the apparatus.

In the manufacture of biscuits according to my improved method the dough is prepared and cut into disks or blanks A of the required form and size by any suitable means, the disks or blanks being impressed with two or more transverse grooves or indentations $a$ $a$ with a view to facilitating the operation of folding or lapping the portions. The disks or blanks thus obtained are then folded or lapped, preferably by mechanical means such as hereinafter described, and any desired impression, such as the maker's name or initials or some ornamental device, having been imparted to the folded product the latter is then ready for being baked. The operation of folding will be readily understood on reference to Figs. 2, $2^a$, 3, and $3^a$.

Apparatus adapted for carrying out the above-described manufacture of biscuits comprises an endless band or carrier B, whereon the disks A of dough are placed and above which are stretched two or more wires C C', arranged transversely to the said band. Each wire is carried at the extremities of two arms D and D', mounted radially upon spindles E and E', which latter are furnished with spur-wheels F and F'. Each of these wheels meshes with a corresponding spur-wheel G and G', carried by counter-shafts H and H', the spur-wheels G and G' meshing together and causing the first-mentioned spur-wheels F and F', together with their respective radial arms D and D', to revolve in opposite directions, as shown by the arrows. The supporting-framework I is provided with a reciprocating bar K, which works in guides K' for operating a suitable stamp or die for imparting to the face of the product, Fig. 3, an ornamental design or the maker's name or initials.

L is a chain-wheel which may be driven from any convenient source of power.

The apparatus may be used separately or be combined with the cutting and stamping machines usually employed in the manufacture of biscuits.

The operation is as follows: The endless band B, having been supplied with disks or blanks A A, prepared as above described, has imparted to it an intermittent motion, and as each row of disks arrives and passes beneath the wire C the rear portion $a'$ of each disk is caught by the said wire and turned over upon its central portion $a^2$. Upon the row arriving at the wire C' the latter catches the front or leading part $a^3$ of each disk and in a similar manner folds it over. The folded portions may be arranged to partially overlap one another, as in the example illustrated. Upon the further movement of the band the disks A are brought beneath the stamp or die K, and the desired impression having been imparted the folded and impressed disks of dough may be conveyed to the oven.

What I claim as my invention, and desire to secure by Letters Patent, is—

For the manufacture of biscuits, the herein-described method consisting in forming the dough into disks or blanks, impressing the same with transverse grooves and then folding the impressed blanks along the lines of the grooves.

WILLIAM THEODORE CARR.

Witnesses:
   A. N. BOWMAN,
   HENRY BROCKBANK.